United States Patent
Hoelen et al.

(10) Patent No.: US 7,572,045 B2
(45) Date of Patent: Aug. 11, 2009

(54) COMPACT LIGHTING SYSTEM AND DISPLAY DEVICE

(75) Inventors: Christoph Gerard August Hoelen, Eindhoven (NL); Gerard Harbers, s'Hertogenbosch (NL); Nicola Bettina Pfeffer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 680 days.

(21) Appl. No.: 10/509,409

(22) PCT Filed: Mar. 21, 2003

(86) PCT No.: PCT/IB03/01147

§ 371 (c)(1),
(2), (4) Date: Sep. 23, 2004

(87) PCT Pub. No.: WO03/083530

PCT Pub. Date: Oct. 9, 2003

(65) Prior Publication Data

US 2005/0180167 A1    Aug. 18, 2005

(30) Foreign Application Priority Data

Mar. 28, 2002    (EP) .................................. 02076206

(51) Int. Cl.
    *F21V 7/04*    (2006.01)
(52) U.S. Cl. ...................... 362/628; 362/613; 362/624; 362/625
(58) Field of Classification Search .................. 362/27, 362/601, 606, 607, 612, 613, 615, 623, 624, 362/625, 626, 628; 349/62, 65
See application file for complete search history.

(56) References Cited

U.S. PATENT DOCUMENTS

| 5,575,549 A | 11/1996 | Ishikawa et al. ............... 362/31 |
| 6,672,734 B2* | 1/2004 | Lammers ..................... 362/612 |
| 7,364,343 B2* | 4/2008 | Keuper et al. ............... 362/628 |
| 2001/0019479 A1* | 9/2001 | Nakabayashi et al. ......... 362/31 |
| 2003/0137821 A1* | 7/2003 | Gotoh et al. ................... 362/31 |
| 2004/0076010 A1* | 4/2004 | Kuo ........................... 362/628 |

FOREIGN PATENT DOCUMENTS

JP    2001-281456    * 10/2001

OTHER PUBLICATIONS

Web page http://en.wikipedia.org/wiki/Reflection_%28physics%29 "Reflection (physics)" from Wikipedia, the free encyclopedia, pp. 1-3.*
New Revised and Updated Random House Webster's College Dictionary, pp. 1-2.*

* cited by examiner

*Primary Examiner*—Y My Quach Lee

(57) ABSTRACT

A compact backlight system has a light-emitting panel (1) with a front wall (2), a rear wall (3) situated opposite thereto, a first edge surface (4) and, opposite thereto, a second edge surface (5). A first light source (6) is associated with the first edge surface (4) which is light-transmitting. The light-emitting panel (1) widens over a widening section (100) from the first edge surface (4) in a direction towards the second edge surface (5), and the rear wall (3) is provided over the widening section (100) with a multiplicity of steps (13, 13', ... ) each having a surface (17) facing the front wall (2) which is substantially parallel to the front wall (2).

9 Claims, 5 Drawing Sheets

COMPACT LIGHTING SYSTEM AND DISPLAY DEVICE

The invention relates to a lighting system provided with a light-emitting panel comprising a front wall, a rear wall situated opposite thereto, and furthermore, between the front and the rear wall, a first edge surface and, opposite thereto, a second edge surface, the first edge surface being light-transmitting, while at least a first light source is associated with the first edge surface, and while, in operation, light originating from the first light source is incident on the first edge surface and distributes itself in the panel.

The invention also relates to a display device provided with said lighting system.

Such lighting systems are known per se and are also denoted edge lighting systems. They are used inter alia as backlighting systems in (picture) display devices, for example for TV sets and monitors. Such lighting systems are particularly suitable for use as backlights for non-emissive displays such as liquid crystal display devices, also denoted LCD panels, which are used in (portable) computers or (portable) telephones.

Said display devices usually comprise a substrate provided with a regular pattern of pixels which are each controlled by at least one electrode. The display device utilizes a control circuit for achieving a picture or a data graphical display in a relevant field of a (picture) screen of the (picture) display device. The light originating from the backlight in an LCD device is modulated by means of a switch or modulator, various types of liquid crystal effects being used. In addition, the display may be based on electrophoretic or electromechanical effects.

Such lighting systems are also used as luminaries for general lighting purposes or for shop lighting, for example shop window lighting or lighting of (transparent or semi-transparent) plates of glass or of synthetic resin on which items, for example jewelry, are displayed. Such lighting systems are further used as window panes, for example for causing a glass wall to radiate light under certain conditions, or to reduce or block out the view through the window by means of light. A further alternative application is the use of such lighting systems for illuminating advertising boards.

In the lighting systems mentioned in the opening paragraph, the light source used is usually a tubular low-pressure mercury vapor discharge lamp, for example one or a plurality of cold-cathode fluorescent lamps (CCFL), wherein the light emitted by the light source during operation is coupled into the light-emitting panel, which acts as an optical waveguide. This waveguide usually constitutes a comparatively thin and planar panel which is manufactured, for example, from synthetic resin or glass, and in which light is transported through the optical waveguide under the influence of (total) internal reflection.

As an alternative light source, such a lighting system may also be provided with a plurality of optoelectronic elements, also referred to as electro-optical elements, for example electroluminescent elements, for example light-emitting diodes (LEDs). These light sources are usually provided in the vicinity of or tangent to a light-transmitting edge surface of the light-emitting panel, in which case light originating from the light source is incident on the light-transmitting edge surface during operation and distributes itself in the panel.

A lighting system is known from U.S. Pat. No. 5,575,549. Light from a linear light source with a uniform brightness is coupled into a light-emitting panel, also denoted as a light pipe, via a light incident edge surface. Part of the light transmitted through said light incident edge surface is made incident upon inclined surfaces of conical or polygonal pyramid-shaped so-called concave portions. Light is coupled out from the light-emitting panel after the light has been refracted at the concave portions in the light conducting member.

A drawback of the known lighting system is that the uniformity distribution of the light coupled out from the light-emitting panel still is relatively poor.

It is an object of the invention to eliminate the above disadvantage wholly or partly. According to the invention, a lighting system of the kind mentioned in the opening paragraph is for this purpose characterized in that the light-emitting panel widens over a widening section from the first edge surface in a direction towards the second edge surface, and in that the rear wall is provided over the widening section with a multiplicity of steps of which a surface facing the front wall is substantially parallel to the front wall.

Since the light-emitting panel has a widening section, which widens from the first edge surface, the light coupled into the light-emitting panel at the area of the first edge surface cannot leave the light-emitting panel during its first travel through the light-emitting panel from the first edge surface towards the second edge surface as long as the light-emitting panel widens. In addition, the light cannot be refracted at the steps on the rear wall of widening section of the light-emitting panel during its first travel through the light-emitting panel from the first edge surface towards the second edge surface because the surface of the steps facing the front wall is substantially parallel to the front wall. The angular distribution of the light traveling from the first edge surface through the widening section of the light guide stays substantially the same because light is reflected by total internal reflection (TIR) on substantially parallel surfaces. However, light traveling in the opposite direction of above mentioned widening section of the light guide does experience a narrowing of the panel and has a chance to be reflected or refracted by the steps and as a consequence can be coupled out through the front surface. To couple light out of the light guide through the front surface requires either a reflection of the light after traveling from the first edge surface to the second edge surface such that after reflection the light travels through a non-widening, for instance narrowing panel or that the panel consists of as well at least one widening section as at least one non-widening section, for instance a narrowing section. Alternatively the panel comprises a widening section followed by a light-guide providing bi-directional light extraction. Since the light coupled into the first edge surface during its first travel through the widening section of the light-emitting panel cannot leave this light-emitting panel, it is promoted that the light during this travel distributes itself in the panel, and also that the light, if originating from two or more, possibly differently colored light sources, is satisfactorily mixed. A good distribution and/or mixing of light promotes the uniformity of the light coupled out from the light-emitting panel. The light-emitting panel acts as it were as a light-mixing chamber for light on its first path through a widening light-emitting panel. Such a light-mixing chamber is usually provided outside the light-emitting panel in known lighting systems, which is why such a light-mixing panel occupies unnecessarily much space. The measure according to the invention as it were integrates the light-mixing chamber into the light-emitting panel, which leads to a considerable saving in space.

It is noted that wedge-shaped light-emitting panels are known per se (see, e.g. the lighting system known from U.S. Pat. No. 5,575,549) but such known wedge-shaped light-emitting panels are widest at the area of the edge surface where the light is coupled into the light-emitting panel and narrowest at the area of the second edge surface.

A particularly compact lighting system is obtained through the measure according to the invention, with a high uniformity of the distribution of the light emitted by the lighting system. A more uniform illumination of the display device is realized thereby in particular in the case of (picture) display devices.

A preferred embodiment of the lighting system according to the invention is characterized in that the ratio of the surface area $S_1$ of the first edge surface and the largest cross section $S_{lcs}$ in the light-emitting panel substantially parallel to the first edge surface (4) satisfies the relation:

$$1 < \frac{S_{lcs}}{S_1} < 10.$$

Light originating from the light source and coupled into a light-emitting panel has an angular distribution which varies between approximately +42° and −42°. The lower limit for the ratio of the surface area $S_1$ of the first edge surface and the cross section $S_{lcs}$ where the light-emitting panel is at the largest thickness, i.e. $S_{lcs}/S_1>1$, is given by the fact that the light-emitting panel is at least wedge-shaped in at least a widening section close to the first edge surface. The upper limit for the ratio $S_{lcs}/S_1<10$ is determined by the wish that the light-emitting panel should not become too thick. In principle, the dimensions (screen diameter) of, for example, the display device determines the size (diameter) of the light-emitting panel. If the first edge surface has a thickness of 2 mm, then the equation $S_{lcs}/S_1=10$ means that either the second edge surfaced or the cross-section of the light-emitting panel parallel to the first edge surface at the largest thickness of the light-emitting panel will have a thickness of 20 mm. The ease of manufacture of the light-emitting panel is also reduced in the case of such high ratios.

Preferably, the ratio $S_{lcs}/S_1$ satisfies the relation $1.5<S_{lcs}/S_1<3$. Light-emitting panels in which the $S_{lcs}/S_1$ ratio lies within the preferred range can be readily manufactured in an (injection) molding process. A particularly suitable ratio is $S_{lcs}/S_1 \approx 2$. For example, a suitable thickness of the first edge surface is 3 mm, which means that for $S_{lcs}/S_1=2$ the largest thickness of the light-emitting panel is 6 mm. An alternative suitable thickness for the first edge surface is 1 mm, which means that the largest thickness of the light-emitting panel is 2 mm in the case of $S_{lcs}/S_1=2$.

A preferred embodiment of the lighting system according to the invention is characterized in that the second edge surface is reflecting with respect to light inside the light-emitting panel. Since the first travel of the light originating from the light source through the widening section of the light-emitting panel serves mainly for uniformly distributing and mixing the light, and in this section the light cannot be coupled out from the light-emitting panel until it has started its return travel through the light-emitting panel, it is important for the light to be reflected at the second edge surface.

In a preferred embodiment of the lighting system according to the invention, the surface of the second edge surface is specularly or diffusely reflecting or is provided with a specularly or diffusely reflecting material. Diffuse reflection promotes the randomization or smoothing of the angular light distribution. In this manner, the lighting system can be made insensible for the radiation pattern of the light sources. Reflection at a specularly reflection surface provides a highly efficient way of keeping the light inside the light-emitting panel. The reflecting material may be, for example, a foil provided on the relevant edge surface.

In a further alternative embodiment of the lighting system according to the invention, the second edge surface is faceted. Faceting of the relevant edge surface renders it possible to direct the light in various directions during reflection. The angular distribution of the light may also be favorably influenced thereby. In a further alternative embodiment of the lighting system, the second edge surface encloses an angle with the rear wall of the light-emitting panel which is greater than 90°.

Because specular reflection can be employed at the thicker end of a widening light-emitting panel according to the invention, also a so-called "double widening" light-emitting panel can be used in which the configuration is like two of the above-mentioned light-emitting panels with the thick ends attached to each other. A particularly preferred embodiment of the lighting system according to the invention is therefore characterized in that the second edge surface is light-transmitting, a second light source being associated with the second edge surface, wherein, in operation, light originating from the second light source is incident on the second edge surface and distributes itself in the panel, and in that the light-emitting panel widens from the second edge surface in a direction towards the first edge surface. It will be clear that a light-emitting panel which widens from the first edge surface as well as from the second edge surface reaches its largest dimensions somewhere in the center of the light-emitting panel.

Alternatively a preferred embodiment of the lighting system according to the invention is characterized in that the light emitting panel comprises between the widening section and the second edge surface a light guide part providing bi-directional light extraction. This is particular of advantage for lighting systems having a relative large size light-emitting panel. In this way the light-emitting panel thickness is kept restricted combined with good light mixing properties and resulting in a high degree of uniformity of light coupled out from the light-emitting panel.

Preferably the rear wall of the bi-directional light extracting light guide part of the light-emitting panel is provided with a structure to extract light by disrupting total internal reflection locally.

In a more preferred embodiment of the lighting system according to the invention the structure on the rear wall of the bi-directional light extracting light guide part of the light-emitting panel is formed by a multitude of steps of which a surface facing the front wall is substantially parallel to the front wall.

A preferred embodiment of the lighting system according to the invention, is characterized in that a further surface of the steps on the rear wall of the light-emitting panel makes an angle β with respect to a normal on the front wall, wherein −48°≦β≦48°. The border values of the angle β are determined by the ratio of the refractive index of the material from which the light-emitting panel is made and the material surrounding the light-emitting panel. In particular, β satisfies the relation $\beta=\arcsin(n_{sm}/n_{lep})$, wherein $n_{lep}$ is the refractive index of the light-emitting panel and $n_{sm}$ is the refractive index of the surrounding material. By way of example, if the light-emitting panel is made from glass with a refractive index $n_{gl}=1.45$ and the surrounding material is air with $n_{air}=1$, then β=arcsin $(1/1.45) \approx 44°$. By avoiding that the angle β exceeds the limit angle for total internal reflection, light cannot substantially be collimated during its first travel through the light-emitting panel, which is favorable in case of a specular reflecting mirror at the second edge surface. Preferably, the angle β is in the range $0 \leq \beta \leq 48°$. With an angle β in the preferred range light is easily coupled out from the light-emitting panel once the light is reflected. Light incident on the further surface of the steps may either be coupled out of the light-emitting panel through the rear wall and subsequently be reflected back into the light-emitting panel or directly be reflected towards the front wall with the possibility of subsequent coupling out through the surface of the front wall. Both contributions can be used together to obtain a uniform distribution of light coupled out through the front surface by tuning the angle β. Alternatively, the angle β may be tuned to minimize the influence of the direct reflection component. For this case a preferred selection of the angle β is 0°. In case of a specular reflector on or directly behind the step, the preferred selection of the angle β is approximately 45° to maximize the efficiency of light extraction from the light-emitting panel through the surface of the front wall and to maximize uniformity of the extracted light.

The light source used may be formed by LEDs, for example white LEDs or different types of LEDs and/or LEDs of different colors which are combined with one another. Colors may be mixed in a desired manner through a suitable use of LEDs, for example for making white light of a desired color temperature. For this purpose, an embodiment of the lighting system according to the invention is characterized in that the light source comprises one white LED or at least two light-emitting diodes with different light emission wavelengths. Preferably, the light source comprises three light-emitting diodes. Employing a single white LED is advantageous because the widening section of the light-emitting panel is used for the homogenization of the light distribution in the light-emitting panel. The LEDs preferably comprise the combinations of red, green, and blue LEDs known per se, or, for example, combinations of red, green, blue, and amber LEDs. LEDs with three light emission wavelengths may also be realized by means of two LEDs with different light emission wavelengths, wherein the LEDs of one of the types are (partly) provided with a phosphor, such that the light emission of the LED is converted by the phosphor into light of a third, desired light emission wavelength. A combination, known per se, of the red, green, and blue LEDs renders it possible to realize color changes independently of the status of the display device. The use of LEDs has the further advantage that dynamic lighting possibilities are obtained. For this purpose, a sensor is present at one of the edge surfaces for measuring the optical properties of the light emitted by the light source during operation.

The quantity of light emitted by the LEDs is adjusted in that the luminous fluxes of the light-emitting diodes are varied. This control of the luminous flux usually takes place in an energy-efficient manner. Thus the LEDs can be dimmed without an appreciable loss in efficacy. Preferably, the intensity of the light emitted by the light-emitting diodes is variable in response to the illumination level of a picture to be displayed by the display device or in response to the level of the ambient light. Preferably, the color point of a picture displayed by the display device is determined by the lighting system. An (improved) dynamic range (for example contrast) of the picture to be displayed by the display device is achieved thereby.

Preferably, each of the light-emitting diodes has a luminous flux of at least 5 lm. LEDs with such a relatively high output are also denoted LED power packages. The use of these high-efficiency, high-output LEDs has the specific advantage that the number of LEDs required for a desired, comparatively high light output can be comparatively small. This benefits the compact construction and the efficiency of the lighting system to be manufactured. Further advantages of the use of LEDs are a comparatively very long useful life, the comparatively low energy cost, and the low maintenance cost for a lighting system with LEDs.

A considerable length is available for mixing the various light colors until the desired color mixture has been reached, for example white light of a predetermined color temperature, in a lighting system with a wedge-shaped light-emitting panel which widens from the first edge surface and in which the light cannot be coupled out during its first travel through the widening section of the light-emitting panel. Light-emitting panels of comparatively large dimensions can be realized in this manner with a light source which comprises in total, for example, only six or even only at most three (high-output) light-emitting diodes with different light emission wavelengths. In an alternative embodiment a single LED suffices. In the known lighting system, a light-mixing chamber of considerable dimensions is usually necessary for such a limited number of LEDs in order to achieve that the light is sufficiently distributed and, in case of multiple LEDs, mixed in the light-emitting panel so as to provide a uniform and homogeneous coupling-out of light from the light-emitting panel in the direction of the (picture) display device.

In a further preferred embodiment, the lighting system comprises control electronics for changing the luminous flux of the light source. The desired lighting effects are achieved by means of suitable control electronics, and the uniformity of the emitted light is improved. White light is also obtained through a suitable combination of LEDs, for which the control electronics provide the possibility of adjusting the desired color temperature.

A particularly compact lighting system is obtained through the measure according to the invention, with a high uniformity of the distribution of the light emitted by the lighting system. A more uniform illumination of the display device is realized thereby in particular in the case of (picture) display devices.

The invention will now be explained in more detail with reference to a number of embodiments and a drawing, in which.

Figure 1:
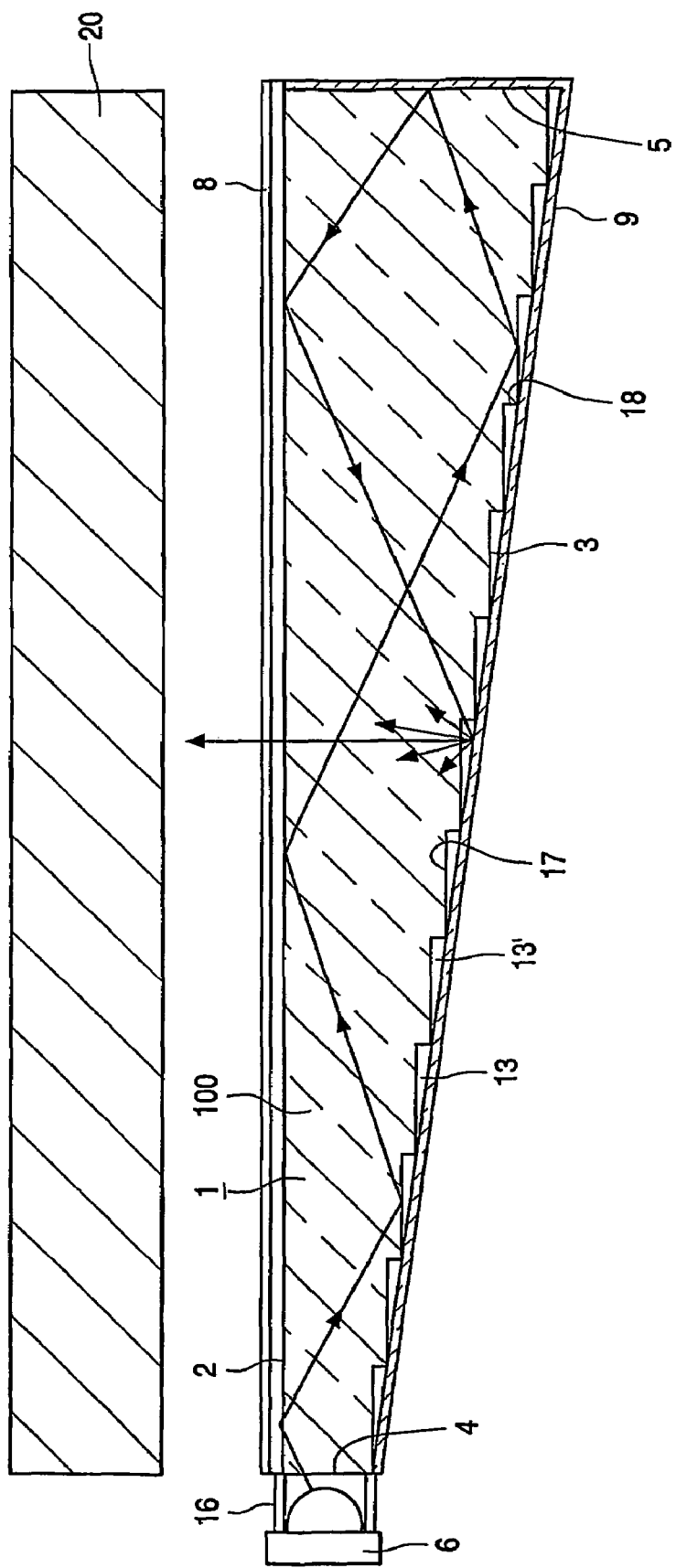
FIG. 1 is a cross-sectional view of a display device comprising an embodiment of the lighting system according to the invention.
Figure 2:
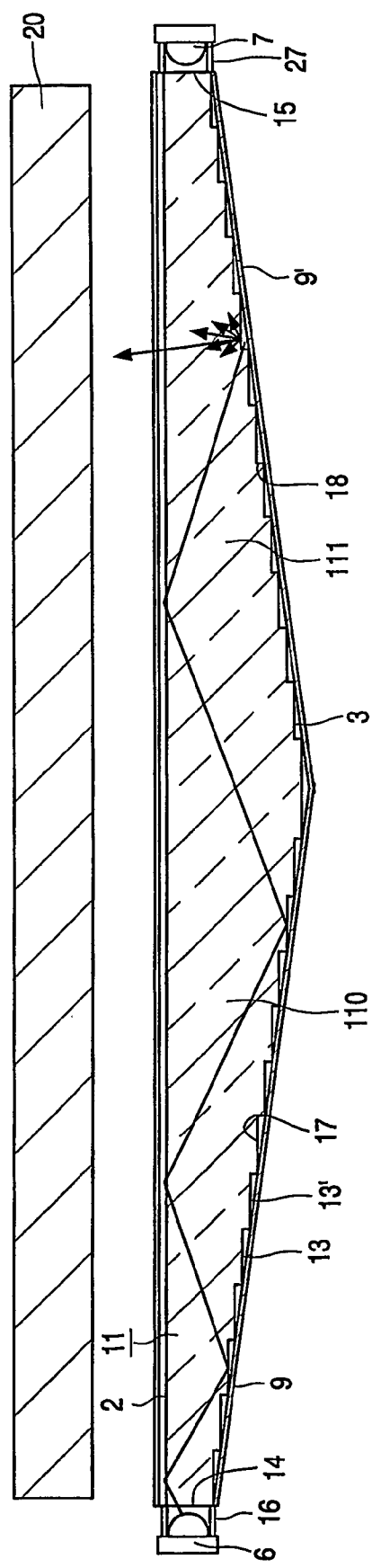
FIG. 2 is a cross-sectional view of a display device comprising an alternative embodiment of the lighting system according to the invention.
Figure 3A:
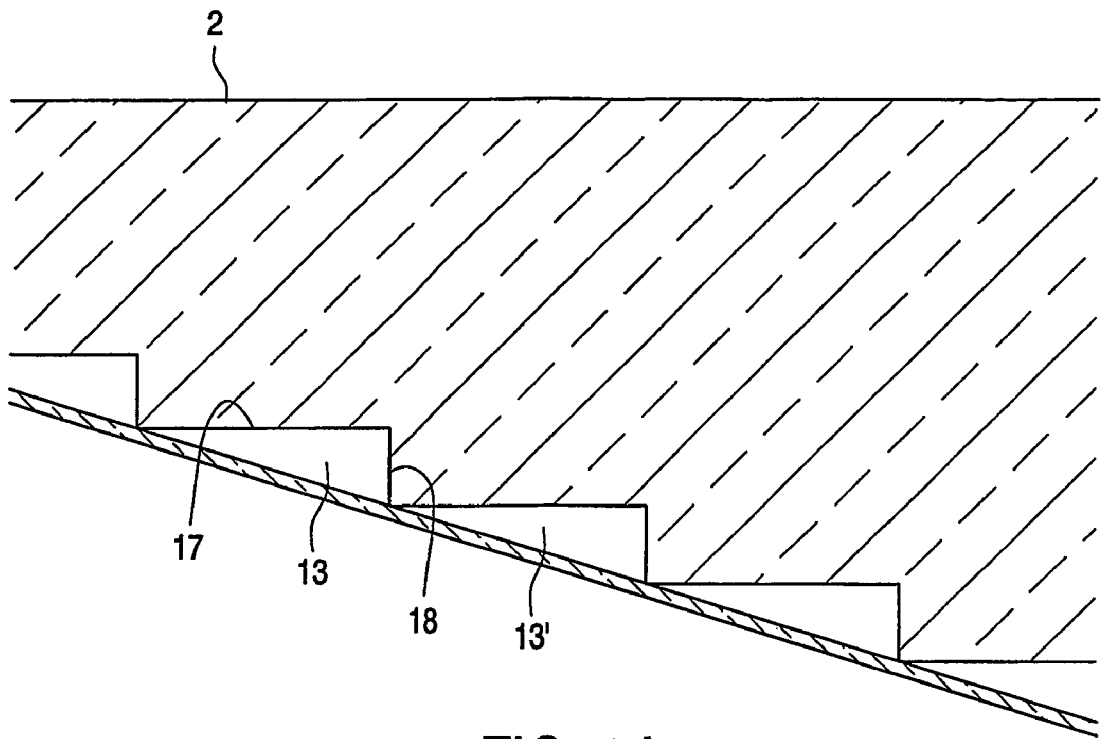
FIG. 3A is a cross-sectional view of an embodiment of a step on the rear wall of the lighting system as shown in FIG. 1 or 2.
Figure 3B:
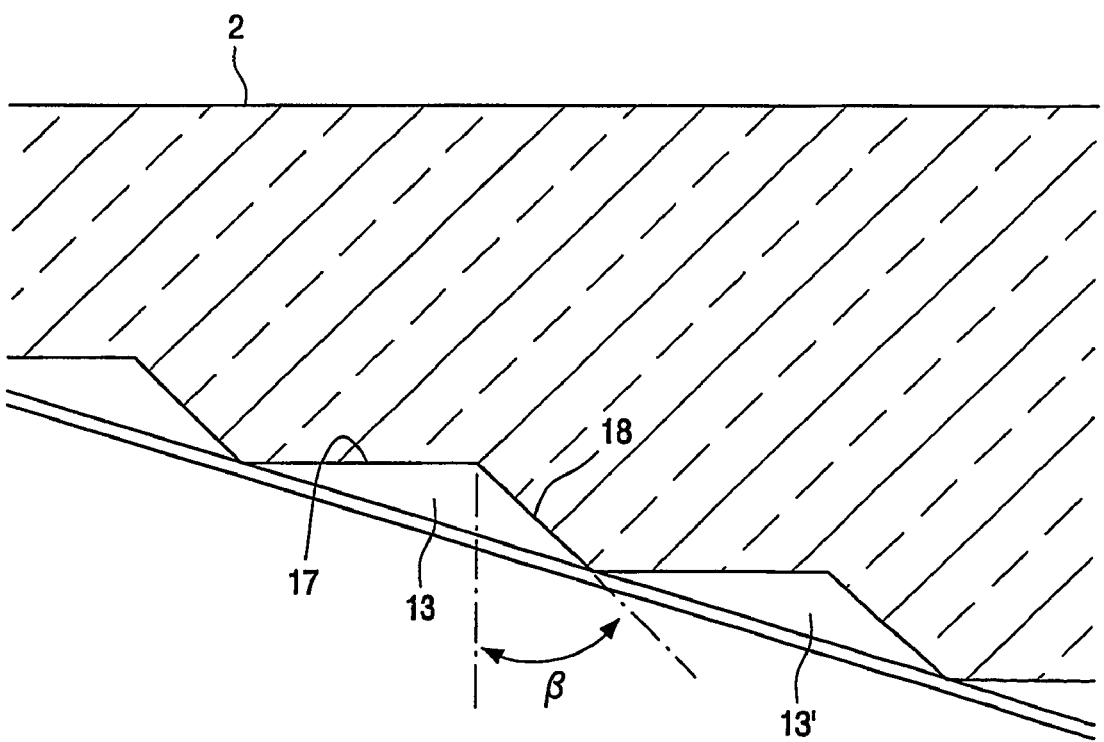
Figure 4:
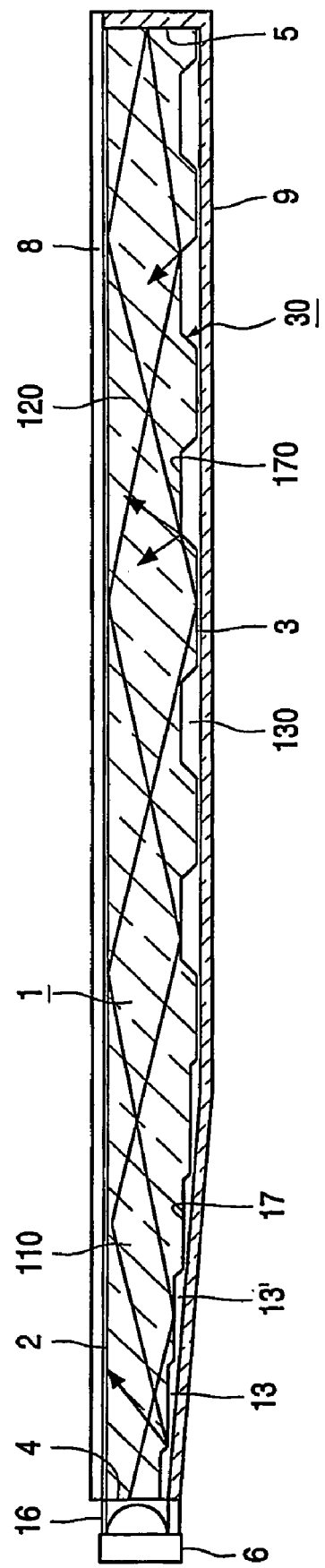
Figure 5:
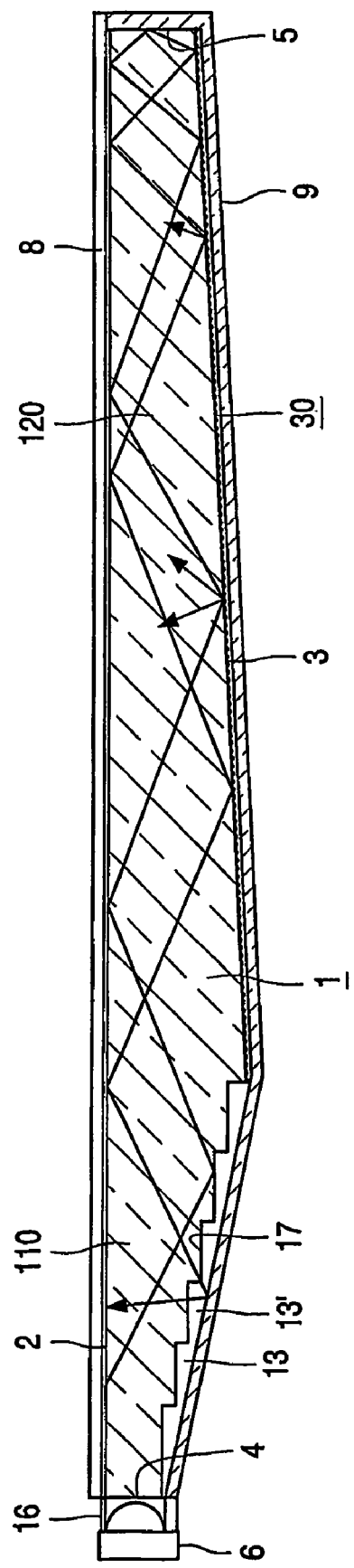

FIG. 3B is a cross-sectional view of an alternative embodiment of a step on the rear wall of the lighting system as shown in FIG. 1 or 2, FIG. 4 is a cross-sectional view of a display device comprising a further embodiment of the lighting system according to the invention, and FIG. 5 is a cross-sectional view of a display device comprising a further alternative embodiment of the lighting system according to the invention.

The Figures are purely diagrammatic and not drawn true to scale. Some dimensions are particularly strongly exaggerated for reasons of clarity. Equivalent components have been given the same reference numerals as much as possible in the Figures.

FIG. 1 is a diagrammatic cross-section of a display device comprising an embodiment of the lighting system according to the invention. The lighting system comprises a light-emitting panel 1 of a light-transmitting material. The light-emitting panel 1 is manufactured, for example, from a synthetic resin, from acryl, from polycarbonate, from pmma, for example perspex, or from glass. Light is transported through the light-emitting panel 1 during operation, utilizing total internal reflection (TIR). The light-emitting panel 1 has a front wall 2 and a rear wall 3 opposite thereto. Between the front wall 2 and the rear wall 3 of the light-emitting panel 1, in addition, there are a first edge surface 4 and a second edge surface 5, in the example of FIG. 1, the first edge surfaces 4 being light-transmitting. The lighting system comprises a light source 6, for example a number of light-emitting diodes (LEDs). In the situation shown in FIG. 1, light originating from the light source 6 is incident on the first edge surface 4 of the light-emitting panel 1 during operation, which light distributes itself in the light-emitting panel 1. Reflector means 16 are provided to guide the light of the LEDs into the light-emitting panel 1. In an alternative embodiment the LEDs are provided inside the light-emitting panel. To this end the light-emitting panel may be provided with a indentation with a shape which is substantially complementary to the shape of the light source. In this case the indentation functions as the first edge surface.

The rear wall 3 of the light-emitting panel 1 is provided with a multiplicity of steps 13, 13', . . . (see also FIGS. 3A and 3B). According to the measure of the invention, the light-emitting panel 1 widens over a widening section 100 from the first edge surface 4 in a direction towards and extends to the second edge surface 5 and the surface 17 of steps 13, 13', . . . facing the front wall 2 is substantially parallel to the front wall 2.

Light is coupled into the light-emitting panel 1 at the thin end (first edge surface 4) of the light-emitting panel 1 and propagates towards the thick end (second edge surface 5) of the light-emitting panel 1. In the example of FIG. 1, the second edge surface 5 is the portion at which the light-emitting panel 1 reaches its largest cross section $S_{lcs}$. During this travel the light-emitting panel 1 behaves like a planar light guide, although the thickness depends on the location. This means that the radiation pattern within the light-emitting panel 1 remains unaltered on its way towards the thick end (second edge surface 5) of the light-emitting panel 1. At the second edge surface 5 the light is reflected and starts to propagate towards the thin end (first edge surface 4) of the light-emitting panel 1 again. However, each light ray that now hits one of the further surfaces 18 of the steps 13, 13', . . . provided on the rear wall of the light-emitting panel 1 will (almost completely) be coupled out from the light-emitting panel 1. To obtain a homogenous flux density of light that is extracted from the light-emitting panel 1 in this manner, a decreasing pitch and/or an increasing height of the steps 13, 13', . . . can be employed.

Preferably, a diffuse reflector 9 is provided adjacent to the rear wall 3 of the light-emitting panel 1. Such a reflector 9 is used to re-direct the light through the light-emitting panel 1 towards the front wall 2 where it issues from the light-emitting panel 1 (see the exemplary light ray depicted in FIG. 1). In addition, the front wall 2 is provided with a translucent diffuser 8. Preferably, the second edge surface 5 is specularly or diffusely reflecting or is provided with a specularly or diffusely reflecting material. In an alternative embodiment, the second edge surface is faceted.

The light-emitting panel 1 emits light in the direction of the display device during operation, for example a liquid crystal display (LCD) device 20. The assembly of the light source 6, the light-emitting panel 1, and the LCD device 20, whether or not accommodated in a housing (not shown in FIG. 1), forms a display device for displaying, for example, (video)images.

The light-emitting panel 1 may further be provided with a sensor (not shown in FIG. 1) for measuring the optical properties of the light. This sensor is coupled to control electronics (not shown in FIG. 1) for suitably adapting the luminous flux of the light source 6. A feedback mechanism can be realized by means of the sensor and the control electronics for influencing the quality and quantity of the light coupled out from the light-emitting panel 1.

Preferably, the light source 6 comprises three light-emitting diodes (LEDs) with a blue, a green, and a red light emission wavelength. The source brightness of a LED is usually many times higher than that of a fluorescent tube. Furthermore, the coupling efficiency of light into the panel with the use of LEDs is greater than with the use of fluorescent tubes. The use of LEDs as a light source has the advantage that the LEDs may lie against panels made from synthetic resin. LEDs transmit hardly any heat in the direction of the light-emitting panel 1, neither do they generate detrimental (UV) radiation. The use of LEDs, in addition, has the advantage that no means need be applied for coupling the light originating from the LEDs into the panel. The LEDs in the lighting system may comprise suitably chosen clusters of blue, green, and red LEDs, or suitable alternative combinations of single-color or dual-color LEDs, or a plurality of white LEDs with high luminous flux.

The LEDs used in the lighting system are preferably LEDs which each have an optical power of at least 50 mW. LEDs with such a high output are also referred to as LED power packages. Examples of power LEDs are LEDs of the "Luxeon™" type (Lumileds), of which the luminous flux per LED is 35 lm for red, 30 lm for green, 8 lm for blue, and 40 lm for amber LEDs. In alternative embodiments, yellow, amber, cyan, magenta, and/or purple LEDs are used which have a comparatively high light output (whether or not with the aid of two spectral light emission wavelengths). It is also possible to use a plurality of white LEDs of high luminous flux. In further alternative embodiments, red LEDs may be used in combination with blue LEDs which are provided with a phosphor, such that the latter emit in two spectral bands, i.e. a blue and a green band.

Preferably, the LEDs are mounted on a (metal-core) printed circuit board. When power LEDs are provided on such a (metal-core) printed circuit board (PCB), the heat generated by the LEDs can be readily removed by the PCB through thermal conduction. An interesting embodiment of the lighting system is furthermore one in which the (metal-core) printed circuit board is in contact with the housing of the display device via a thermally conducting connection.

Preferably, the ratio of the surface area $S_1$ of the first edge surface 4 and the largest cross section $S_{lcs}$ in the light-emitting panel substantially parallel to the first edge surface (4) satisfies the relation: relation $1 < S_{lcs}/S_1 < 10$.

FIG. 1 diagrammatically depicts a radiation path from the light source 6. Light coming from the light source 6 and coupled into the light-emitting panel 1 has an angular distribution which varies between approximately +45° and −45° (the angular distribution is dependent on the refraction of light from air to glass or to a transparent synthetic resin or from the synthetic resin around the LED to the light-emitting panel when these materials are in optical contact). Owing to total internal reflection, the light coming from the light source 6 is reflected against the front wall 2 and the rear wall 3 of the light-emitting panel 1, while it is impossible for the light to be coupled out because the light-emitting panel 1 widens over its widening section 100, i.e. the angle of incidence (with respect to the perpendicular to the front wall 2 or the rear wall 3) is greater than the so-called limit angle for total internal reflection. Indeed, since the light-emitting panel 1 widens over its widening section 100 from the first edge surface 4 and the surface 17 of the steps 13, 13', ... is substantially parallel to the front wall 2 of the light-emitting panel 1, consecutive angles of incidence remain substantially the same. Subsequently, the light is reflected at the second edge surface 5. On its return path through the light-emitting panel 1, the light is confronted with a light-emitting panel 1 which narrows. The light may hit one of the further surfaces 18 of the steps 13, 13', ..., whereupon the light becomes reflected at the diffuse reflector 9 provided adjacent to the rear wall 3 and is coupled out from the light-emitting panel 1. This situation is diagrammatically indicated with the arrows in FIG. 1.

Since the light-emitting panel widens over its widening section 100 from the first edge surface 4 and the surface 17 of the steps 13, 13', ... is substantially parallel to the front wall 2, according to the invention, the light cannot leave the light-emitting panel 1 during its first travel from the first edge surface 4 through the widening section 100 of the light-emitting panel 1. It is promoted thereby that the light in its first travel through the light-emitting panel 1 distributes itself and is mixed in the light-emitting panel 1. A good distribution and/or mixing of light promotes the uniformity and the homogeneity of the light coupled out from the light-emitting panel 1. The light-emitting panel 1 such as shown in FIG. 1 acts as it were a light-mixing chamber for light during its first travel through a widening light-emitting panel. According to the measure of the invention, the light-mixing chamber is as it were integrated into the light-emitting panel, which leads to a considerable saving in space. A particularly compact lighting system is obtained through the measure according to the invention, with a high uniformity of the distribution of the light emitted by the lighting system. A more uniform illumination of the (picture) display device is realized thereby. Preferably, the ratio $S_{lcs}/S_1$ fulfills the relation $1.5<S_{lcs}/S_1<3$. Light-emitting panels in which the $S_{lcs}/S_1$ ratio lies within the preferred range can be readily manufactured in an (injection) molding process. A particularly suitable ratio is $S_{lcs}/S_1 \approx 2$.

FIG. 2 shows schematically a cross-sectional view of a display device comprising an alternative embodiment of the lighting system according to the invention. The lighting system comprises a light-emitting panel 11 of a light-transmitting material. Light is transported through the light-emitting panel 11 during operation, utilizing total internal reflection (TIR). The light-emitting panel 11 has a front wall 2 and a rear wall 3 opposite thereto. Between the front wall 2 and the rear wall 3 of the light-emitting panel 1, in addition, there are a first edge surface 14 and a second edge surface 15, both edge surfaces 14, 15 in this embodiment being light-transmitting. The lighting system comprises a light source 6, 7, for example a number of light-emitting diodes (LEDs). In the situation shown in FIG. 2, light originating from the light source 6, 7 is incident on the first edge surface 4 and second edge surface 5 of the light-emitting panel 11, respectively, which light, during operation, distributes itself in the light-emitting panel 11. Reflector means 16, 27 are provided to guide the light of the LEDs into the light-emitting panel 11. The rear wall 3 of the light-emitting panel 11 is provided with a multiplicity of steps 13, 13', ... (see also FIGS. 3A and 3B). According to this embodiment of the invention, the light-emitting panel 11 widens over a first widening section 110 from the first edge surface 14 in a direction towards the second edge surface 15 as well as widens over a second widening section 111 from the second edge surface 5 in a direction towards the first edge surface 4. In addition, the surface 17 of steps 13, 13', ... facing the front wall 2 is substantially parallel to the front wall 2. Light is coupled into the light-emitting panel 11 at both thin ends (first and second edge surface 4, 5) and propagates towards a center portion of the light-emitting panel 11 where the thickness is larger than at the first and second edge surfaces 14, 15. In the example of FIG. 2, this center portion is the portion at which the first and second widening section 110, 111 fit to each other and at which the light-emitting panel 11 reaches its largest cross section $S_{lcs}$. Preferably, a diffuse reflector 9, 9' is provided adjacent to the rear wall 3 of the light-emitting panel 1. In addition, the front wall 2 is provided with a translucent diffuser 8.

The light-emitting panel 11 emits light in the direction of the display device during operation, for example a liquid crystal display (LCD) device 20. The assembly of the light source 6, the light-emitting panel 11, and the LCD device 20, whether or not accommodated in a housing (not shown in FIG. 2), forms a display device for displaying, for example, (video)images. Preferably, the light source 6, 7 comprises three light-emitting diodes (LEDs) with a blue, a green, and a red light emission wavelength.

In an alternative embodiment of the light-emitting panel as shown in FIG. 2, the second light source is omitted at the second edge surface and the second edge surface is reflecting.

FIG. 3A shows a cross-sectional view of a detail of an embodiment of a step on the rear wall of the lighting system as shown in FIG. 1 or 2. The surface 17 of the steps 13, 13', ... is substantially parallel to the front wall 2. In the example of FIG. 3A the further surface 18 of the steps 13, 13', ... is substantially orthogonal with respect to the surface 17 of the steps 13, 13', ...

FIG. 3B is a cross-sectional view of a detail of an alternative embodiment of a step on the rear wall of the lighting system as shown in FIG. 1 or 2. The surface 17 of the steps 13, 13', ... is substantially parallel to the front wall 2. In the example of FIG. 3B the further surface 18 of the steps 13, 13', ... makes an angle with respect to the surface 17 of the steps 13, 13', .... This angle is depicted in FIG. 3B as an angle β with respect to the normal on the front wall. There may be a large variety with respect to the value of angle β. Preferably, $-48 \leq \beta \leq 48°$. Light-emitting panel are more easily manufactured if $0 \leq \beta \leq 48°$. In the situation of FIG. 3A, $\beta \approx 0°$, which is particularly favorable embodiment. In an alternative embodiment the shape of the steps is concave of convex. Such concave of convex forms facilitate the manufacturing of the light-emitting panel.

FIG. 4 is a diagrammatic cross-section view of a display device comprising a further embodiment of the lighting system according to the invention. The lighting system comprises a light-emitting panel 1 of a light-transmitting material. The light-emitting panel has a widening section 110 and comprises between the widening section 110 and the second edge surface 5 a light guide part 120 providing bi-directional light extraction. The rear wall 3 of the light-emitting panel 1 is provided at the bi-directional light extracting light guide part 120 with a structure 30 to extract light by disrupting total internal reflection locally. In the embodiment shown in FIG. 4 the structure 30 on the rear wall at the bi-directional light extracting light guide part is formed by a multitude of steps 130 of which a surface 170 facing the front wall is substantially parallel to the front wall.

Alternatively possible techniques for the light extracting structure are for instance screen-printed dots and microstructures like grooves.

In the shown embodiment the front wall 2 and the rear wall 3 of the light-emitting panel are substantially parallel over the bi-directional light extracting light guide part.

FIG. 5 is a diagrammatic cross-section view of a display device comprising a further alternative embodiment of the lighting system according to the invention. In the shown embodiment the front wall 2 and the rear wall 3 of the light-emitting panel at the bi-directional light extracting light guide part are slightly tapered with respect to each other in the direction of the second edge surface.

In an even further alternative embodiment (not shown) the light-emitting panel comprises a first widening section widening from tm the first edge surface, a bi-directional light extracting light guide part and a second widening section widening from the second edge surface.

It will be obvious that many modifications are possible to those skilled in the art within the scope of the invention. While using the light-emitting panel according to the invention are with straight parallel steps (angle β≈0°), the flux density distribution of the light that is emitted from the light-emitting panel can easily be controlled as a function of position along a line perpendicular to the light source. In addition, a relatively simple translucent diffuser can be used on top of the front wall of the light-emitting panel. Preferably, a simple white diffuser can be used adjacent the rear wall. Because a diffuse reflector may be used behind the "steps" the light emitted from the panel has from itself already a wide angular distribution which is advantageous for wide viewing angle panels. In addition, the light-emitting panel can be injection molded, this is particularly advantageous when relatively small LEDs, or at least LEDs or LED packages that are small in one dimension are employed.

The scope of protection of the invention is not limited to the embodiments given. The invention resides in each novel characteristic and each combination of characteristics. Reference numerals in the claims do not limit the scope of protection thereof. The use of the verb "comprise" and its declinations does not exclude the presence of elements other than those specified in the claims. The use of the indefinite article "a" or "an" preceding an element does not exclude the presence of a plurality of such elements.

The invention claimed is:

1. A lighting system comprising:
   a light-emitting panel comprising a front wall, a rear wall situated opposite thereto, and, between the front and the rear wall, a first edge surface and, opposite thereto, a second edge surface, the first edge surface being light-transmitting, and
   a first light source associated with the first edge surface, such that, in operation, light originating from the first light source is incident on the first edge surface and distributes itself in the panel,
   wherein the light-emitting panel widens over
      i. a first widening section from the first edge surface in a direction towards the second edge surface and
      ii. a second widening section from the second edge surface in a direction towards the first edge surface,
   wherein the surface of the second edge surface is specularly or diffusely reflects, and
   wherein the light-emitting panel comprises, between the first widening section and the second edge surface, a light guide part including a structure configured for providing light extraction.

2. A lighting system as claimed in claim 1, wherein a ratio of the surface area $S_1$ of the first edge surface and the largest cross section $S_{lcs}$, in the light-emitting panel substantially parallel to the first edge surface satisfies the relation:

$$1.5 < \frac{S_{lcs}}{S_1} < 3.$$

3. A lighting system as claimed in claim 1, wherein the rear wall is provided over at least the first widening section with the structure that includes a multiplicity of steps having surfaces that face the front wall and are substantially parallel to the front wall, and wherein a further surface of the steps makes an angle β with respect to a normal on the front wall, wherein
   $-48 \leq \beta \leq 48°$.

4. A lighting system as claimed in claim 3, wherein the angle β is in the range
   $0 \leq \beta \leq 48°$.

5. A lighting system as claimed in claim 1, wherein the front wall is comprises a translucent diffuser.

6. A lighting system as claimed in claim 1, wherein the rear wall of the light-emitting panel is provided with the structure to extract the light by disrupting total internal reflection locally.

7. A lighting system as claimed in claim 1, wherein the light source comprises one white LED or at least two light-emitting diodes with different light emission wavelengths.

8. A lighting system as claimed in claim 7, wherein each of the light-emitting diodes has a luminous flux of at least 5 lm.

9. The lighting system of claim 1, wherein a ratio of the surface area $S_1$ of the first edge surface and the largest cross section $S_{lcs}$ in the light-emitting panel substantially parallel to the first edge surface satisfies the relation:

$$1 < \frac{S_{lcs}}{S_1} < 10.$$

* * * * *